UNITED STATES PATENT OFFICE.

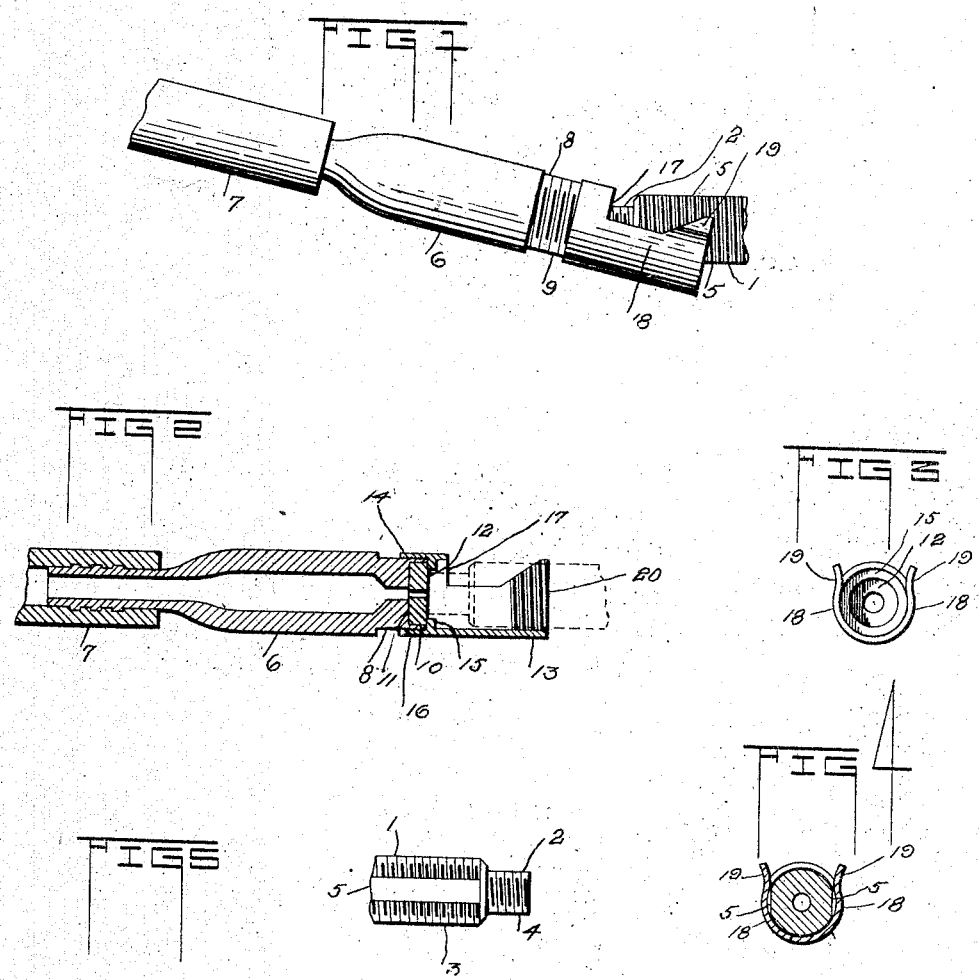

ANTHONY HAGEN, OF PEORIA, ILLINOIS.

COUPLING.

1,175,440.   Specification of Letters Patent.   Patented Mar. 14, 1916.

Application filed August 31, 1912. Serial No. 718,018.

*To all whom it may concern:*

Be it known that I, ANTHONY HAGEN, citizen of the United States, residing at Peoria, in the county of Peoria and State of Illinois, have invented certain new and useful Improvements in Couplings, of which the following is a specification.

This invention has reference to couplings, and has for its object to provide a coupling which is more especially adapted as a connection for inflation valves, but which may be used as a hose coupling or for similar purposes.

The invention has for a further object to provide a coupling which, when attached to the stem of the inflation valve will not detach itself or become dislodged under the pressure of the air.

Inflation valves for automobile tires and the like, at the present time, include, stems which are uniform in construction, although varying in size, and a device which may be adapted for making quick connections with the stems of such as to be easily and quickly attached to and detached therefrom and so arranged as not to leak. There have been devices made for this purpose, but the method of connection has been such that the gasket against which the end of the valve stem abuts has become quickly worn, necessitating a change of gasket very often. In my device all such disadvantages are entirely obviated.

That the invention may be more fully understood, reference is had to the accompanying drawings in which:—

Figure 1 is a side elevation of my coupling, showing one way of connecting same to a valve stem; Fig. 2 is a longitudinal section through the coupling, and in dotted lines showing the valve stem in connected relation therewith; Fig. 3 is an end view of the coupling; Fig. 4 is a cross-section of coupling and valve stem showing another way of connecting same, and Fig. 5 is a detail showing the valve stem and its flat faces.

In the drawings, like characters of reference denote corresponding parts throughout the figures.

The valve stem of the inflation valve is designated 1 and has the reduced head 2. The body of the stem is threaded, as at 3, and the head thereof is threaded, as at 4, the body of said stem having the opposite flat faces 5 extending longitudinally thereof.

My coupling includes a nozzle 6 suitably connected with a hose 7, or other suitable feeder, and said hose or feeder is adapted for connection with a suitable supply of air or other fluid. The nozzle has the reduced end 8 threaded exteriorly thereof, as at 9, which end of the nozzle is formed with the annular seat 10. The nozzle is tubular, as will be understood, and the opening out of the end of the nozzle is restricted and not very large leaving a substantial wall 11 against which a gasket 12 will bear, the gasket being detachably carried in the annular seat 10 of the nozzle, as shown in Fig. 2.

13 designates, what may be referred to, as the clamp or attaching member of the coupling. This clamp at its inner end is tubular in cross-section, as at 14, and formed with an inner annular flange 15, of suitable depth, which is placed at a suitable distance from the end of the clamp. The inner face of the clamp between said flange and the end of the clamp is threaded, as at 16 to adapt the tubular end of the clamp to have a threaded relation with the threaded end 9 of the nozzle, and when said clamp is attached to the nozzle, the flange 15 will bear against the gasket 12 firmly holding the same in the seat 10 of the nozzle and against the wall 11 thereof.

From a point 17, the clamp is cut away leaving only the side walls 18, which appear bifurcated, see Figs. 3 and 4 and the extremital portions of said walls 18, form spring fingers 19, separated from each other a distance slightly less than the full diameter of said clamp. The inner wall of said bifurcated extremity is threaded at 20, see Fig. 2, these threads 20 corresponding to the threads 3 on the body of the stem 1.

To adapt the coupling to the different sizes of valve stems, the engaging or bifurcated end of the clamp may be made larger or smaller as the case may demand and to adapt the coupling as a hose coupling modification of size is all that is necessary.

In Fig. 1, I have shown the coupling inclined at an angle to the valve stem, the reduced end 2 of the said stem entering through the flange 15 in the tubular end of the clamp and bearing against the gasket 12, which point of contact serves as a fulcrum on which the coupling may be swung to bring the threaded end 20 of the clamp into threaded engagement with the body of the stem 1, the spring portions 19 of the clamp making it necessary to force the clamp over the stem and the threads of the clamp meshing with the threads on the stem and serving to lock the parts against endwise movement.

Another method of attaching is illustrated in Fig. 4, wherein the clamp is moved endwise on said stem with the resilient side walls sliding on the smooth faces 5 of the stem. Then when the end of the stem engages the gasket 12, the clamp is rotated and the threaded walls 18 engage the threads 3 on the stem locking the stem to the nozzle.

It is obvious that various changes may be made in practice in detail and construction. As stated before, the clamp holds the stem positively, preventing separation of the nozzle and stem during the inflating operation. The device is simple, being composed of few parts, readily assembled and not liable to get out of order, the principal advantage being in the facility with which the coupling may be attached and positively locked to the valve stem.

What I claim is:—

1. A coupling to connect two parts, comprising a nozzle and a clamping member detachably connected thereto, said nozzle member having an annular seat formed on one end thereof and having a bore or passage extending there through, said bore or passage being restricted at said seat end, a gasket seated in said seat, said clamping member having means to hold said gasket on said seat, and also having one end portion formed with spaced side walls internally threaded so as to detachably receive therebetween one of the parts to be connected, said nozzle being connected to the other part to be connected, the spacing of the side walls permitting the lateral movement of the coupling after the part to be connected has been moved into engagement with the gasket, thereby holding the part and the coupling in alinement with the end of the part against the gasket.

2. A coupling to connect two parts comprising a nozzle member and a clamping member detachably connected thereto, said nozzle member having an annular seat formed on one end thereof and having a bore or passage extending there through, said bore or passage being restricted at said seat end, a gasket seated in said seat, said clamping member being threaded to said seat end of said nozzle portion and having an internal flange engaging said gasket to hold it on said seat, the other end of said clamping member being cut out to provide resilient side walls to receive and detachably engage one of the parts to be connected, said nozzle being connected to the other part to be connected, the cutting out of the end of the clamping member permitting the application of the end of the part to be connected against the gasket and permitting the lateral movement of the coupling so as to place the coupling in alinement with the part to be connected with its end held against the gasket.

3. A coupling to connect two parts comprising a nozzle member and a clamping member detachably connected thereto, said nozzle member having an annular seat formed on one end thereof and having a bore or passage extending there through, said bore or passage being restricted at said seat end, a gasket seated in said seat, said clamping member being threaded to said seat end of said nozzle portion and having an internal flange engaging said gasket to hold it on said seat, the other end of said clamping member being cut out to provide resilient side walls internally threaded to receive and detachably engage one of the parts to be connected, said nozzle being attached to the other part to be connected, the cutting out of the end of the clamping member permitting the application of the end of the part to be connected against the gasket and permitting the lateral movement of the coupling so as to place the coupling in alinement with the part to be connected with its end held against the gasket.

4. A coupling to connect two parts, comprising a nozzle member and a clamp member, said nozzle having a bore or passage therethrough and a seat formed on one end, said bore or passage being restricted at said seat end, a gasket positioned on said seat, said clamp member having means for detachable connection to said nozzle member and also means to hold said gasket on said seat, said clamp member being cut away and provided with clamping means, said cut away portion being adapted to receive the end of a member to be coupled to permit its movement until it engages said gasket, when said clamp member may be moved laterally due to the cut away portion to permit said clamping means to engage the member to be coupled and hold its end against said gasket.

5. A coupling to connect two parts comprising a nozzle member and a clamping member, said nozzle member having a seat formed on one end and a bore or passage therethrough, a gasket seated on said seat, said nozzle member having its end threaded, said clamping member having one end tubular in cross-section and threaded to said threaded end of said nozzle member, an internal annular flange formed at the end of said thread to engage and hold said gasket in its seat, the other portion of said clamping member being cut away to leave spaced side walls, with an opening therebetween adapted to receive a valve stem, the end portions of which are threaded and have extended extremital portions to form spring fingers, whereby a valve stem may have its end moved into engagement with said gasket and the coupling moved laterally whereby said spring fingers will clamp the threaded portion of the valve stem to hold it in position.

6. A coupling for inflation valves for tires including a nozzle member and a clamping member, the nozzle member having a bore or passage therethrough and adapted to be connected to a suitable source of air supply and also having a gasket at one end, said clamping member being detachably connected to said nozzle member and having a flange to hold said gasket in position, said clamping member having its intermediate portion cut out and its other end portion cutaway to provide spaced resilient gripping members, said gripping members being internally threaded, said cut out intermediate portion being adapted to receive the end of the valve stem which bears against the gasket, and said cutaway portion permitting the lateral movement of the coupling to permit the gripping members to embrace the valve stem, the threads thereof engaging to hold the parts securely together.

7. A coupling for inflation valves for tires, including a nozzle member and a clamping member, the nozzle member having a bore or passage therethrough and adapted to be connected to a suitable source of air supply, said clamping member being detachably connected to said nozzle member at one end and having its other end portion cut away to provide spaced resilient gripping members, said gripping members being provided with means adapted to coöperate with the end of the valve stem to hold it against the end of the nozzle member, said cut away portion permitting the application of the end of the valve stem against the end of the nozzle member and also permitting the lateral movement of the coupling to cause the gripping members to embrace the valve stem and to place the coupling and valve stem in alinement.

In testimony whereof I affix my signature, in presence of two witnesses.

ANTHONY HAGEN.

Witnesses:
GEORGE S. BRAN,
HENMINA J. ROHLFS.